April 18, 1933.   J. F. RULE   1,904,985
MACHINE FOR FORMING HOLLOW GLASSWARE
Filed Sept. 15, 1927
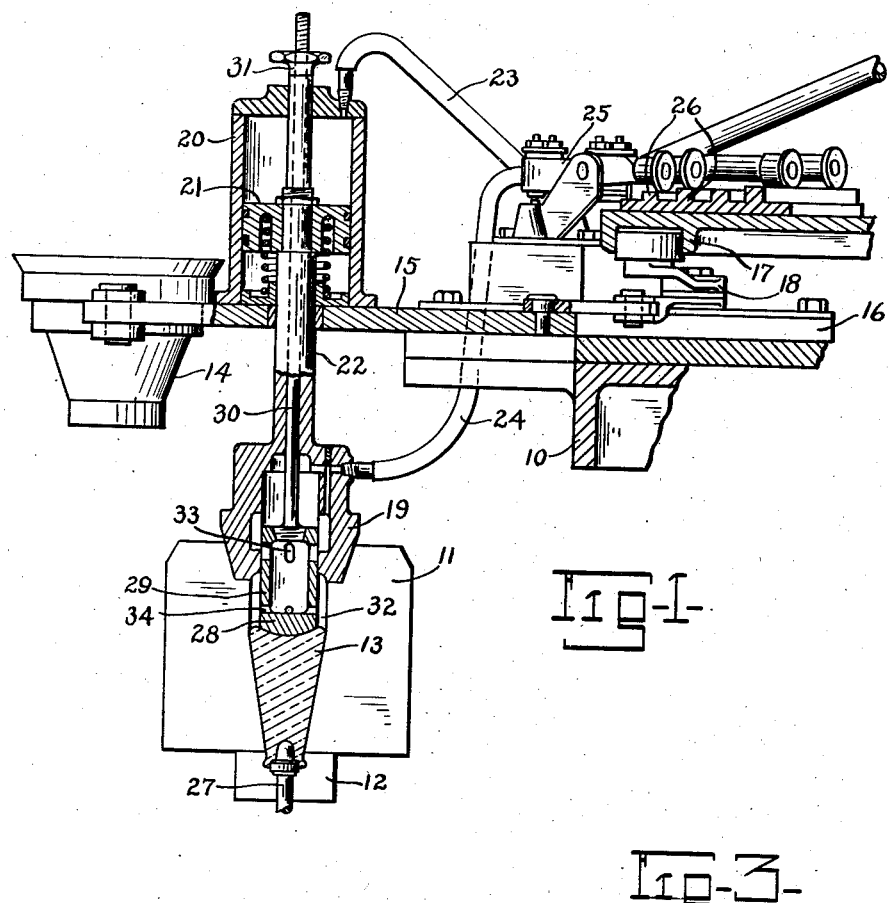
Fig-1-
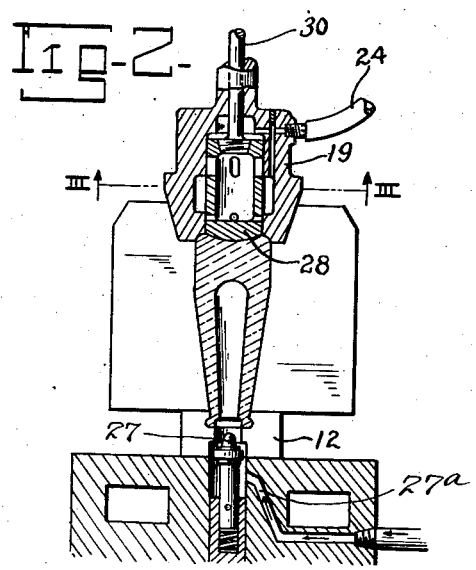
Fig-2-
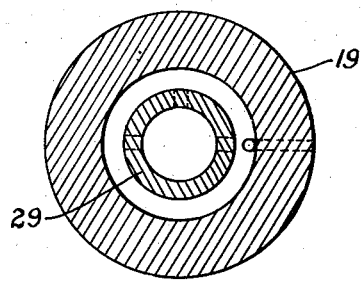
Fig-3-
Inventor
John F. Rule.

Patented Apr. 18, 1933

1,904,985

UNITED STATES PATENT OFFICE

JOHN F. RULE, OF TOLEDO, OHIO

MACHINE FOR FORMING HOLLOW GLASSWARE

Application filed September 15, 1927. Serial No. 219,596.

My invention relates to machines for forming hollow glassware in molds and particularly to means associated with the molds for regulating and controlling the action of the glass while being blown in the molds.

The invention is particularly adapted for use with machines of the type in which a charge of glass is introduced into an inverted blank mold through the open upper end thereof and expanded to hollow form by air pressure supplied through the lower end of the mold, after which the parison thus formed is transferred to a finishing mold and blown to its final shape.

In machines of the type indicated, it is found in practice that the method of forming the charge of glass, including the blowing thereof to hollow form within the blank mold, results in an uneven distribution of the glass over the side walls of the mold cavity, which gives to the finished ware an imperfect or wavy appearance.

An object of the present invention is to overcome this objectionable feature by providing means for modifying and controlling the action of the glass as it is expanded in the blank mold and thus obtaining a more even distribution of the glass during such expansion. In its preferred form, the invention comprises a glass contacting member or follower plate which, after the charge of glass has been introduced into the blank mold and compacted therein in the usual manner, seats on the upper surface of the charge in the mold and is carried upward with the charge as the latter is expanded upwardly in the mold by air pressure supplied through the lower end of the mold. This follower plate serves to control the distribution of the glass in a manner hereinafter set forth.

Referring to the accompanying drawing:

Figure 1 is a sectional elevation view of a portion of a machine to which my invention is applied.

Figure 2 is a view of the blank mold and associated parts shown in Figure 1, but with the charge of glass blown to hollow form and the follower moved upward within the blow head.

Figure 3 is an enlarged sectional view in an upward direction, at the plane of the line III—III on Figure 2.

The invention as illustrated is embodied in a glass forming machine comprising a rotary mold carriage 10 on which are mounted a series of blank molds 11 and neck molds 12 in register therewith. The mold carriage may be rotated in the usual manner to bring the inverted blank molds in succession past a charging station at which charges of glass, 13 are delivered to the molds.

Associated with each blank is a funnel guide 14 carried on a plate 15 slidable radially of the mold carriage in guides 16. A stationary cam 17 operates through connections 18 to periodically move the guide 14 inward to a position to guide a charge of glass into the mold. A blowing head 19 is also carried by the slide plate 15 and is periodically moved thereby to a position over the blank mold. The blowing head is moved vertically into and out of engagement with the mold by means of an air motor comprising a cylinder 20 mounted on the plate 15, piston 21 and a piston rod 22 to which the blowing head is attached. Air under pressure is supplied to the cylinder 20 and the blowing head 19 through flexible pipe connections 23 and 24, respectively, from any suitable source (not shown), the supply being controlled by valves contained within a valve box 25, said valves being actuated by stationary cams 26.

The glass blowing machine as thus far described may be similar to that disclosed in the United States patent to Richard LaFrance, Number 1,878,863, September 20, 1932, to which reference may be had for a description of the entire machine.

After a charge of glass 13 has been dropped into the mold, the carrier plate 15 is moved outward to bring the blowing head 19 directly over the mold. Said head is then lowered into engagement with the mold, as shown in Figure 1, and air under pressure is supplied through the pipe 24 to compact the glass in the mold in the usual manner, and also to form the neck portion of the bottle or other article being formed. The neck pin 27 is then withdrawn, leaving an initial blow opening in the blank. Air under pressure is directed in the usual manner through an air line 27ᵃ and the neck mold and applied at said initial blow opening to expand the glass in the blank, thereby forming a hollow parison, as shown in Figure 2.

In order to control the glass during this expansion or blowing-up operation, I provide a control plate or follower 28 which, after the blowing head 19 is seated on the mold, is moved downward into position to rest upon the upper surface of the glass and moves upward with the glass as the latter is expanded in the mold. As shown, the plate 28 forms the lower end of a cylinder 29 which constitutes a piston slidable up and down within the blowing head 19. A stem 30 attached to the cylinder 29, extends upward through the hollow piston rod 22 and at its upper end is screw threaded to receive an adjustable nut 31 which seats on the upper end of the piston rod and thereby adjustably limits the downward movement of the follower plate. If desired, the follower may be adjusted by means of the nut 31, so that it will be held out of contact with the glass while the latter is being blown down and compacted in the mold by air pressure supplied through the blowing head. After this blow-down operation, the air pressure within the blow head is either cut off or reduced, the neck pin 27 withdrawn and air pressure supplied through the neck mold in the usual manner to expand the glass. During this expansion, the follower plate 28 rests on the upper surface of the glass and is carried upward thereby as the glass is blown upward in the mold.

Without the use of the follower plate, there is a more or less uneven distribution of the glass over the side walls of the mold. This may be due to the fact that the glass in contact with the mold walls is chilled to a certain extent, so that when the upward blowing operation takes place there is a tendency for the hotter glass forming the interior of the parison to break through the more or less chilled upper surface of the glass. This comparatively hot glass rolling out into contact with the mold walls combined with the chilled portions, produces an uneven surface distribution of glass in the parison walls, with the result that the finished ware has an uneven or wavy appearance.

In the present invention, the follower plate 28 which bears on the upper surface of the glass with more or less pressure during the upward expanding movement of the glass, prevents the interior portion of the mass from breaking through in the manner above noted. In other words, the surface skin of chilled glass enveloping the comparatively hot plastic interior, remains intact and is stretched out to conform to the shape of the mold, whereby an even distribution of glass is obtained, so that the finished ware is free from the defect above noted. The follower 28 may be substantially the same diameter as the mold cavity, but is preferably of somewhat smaller diameter, leaving an annular space 32 between the follower and the mold walls. During the expansion of the parison, a certain amount of air pressure may be supplied through the blowing head, if desired. This pressure is transmitted through openings 33 and 34 in the cylinder 29 to the annular space 32. This air has a certain cooling effect on the upper exposed surface of the glass surrounding the follower and also applies a downward pressure to the glass, thereby preventing an upward movement of the glass between the follower and the walls of the mold. It will also be noted that the air pressure supplied through the blowing head at this time causes the follower plate to bear down against the glass with a corresponding pressure. This pressure increases the effectiveness of the follower plate in controlling the expanding movement of the glass.

The follower plate 28 when at the upper limit of its movement in the blowing head, serves as a mold bottom. As shown in Figure 2, the plate 28 and surrounding blowing head form the mold bottom or closure plate and shape the end of the parison.

Modifications may be resorted to within the spirit and scope of my invention.

What I claim is:

1. In a machine for forming hollow glass articles, the combination of a mold open at its upper end to receive a charge of glass, a blow head movable to and from the mold and adapted to seat on the said open end of the mold, a piston within the blow head adapted to be projected downward into the mold into position to rest on the glass in the mold, and means for supplying air to the blow head for compacting the glass in the mold, said piston being movable upwardly by the pressure of the glass thereon when the glass is blown upward in the mold by air pressure supplied through the lower end thereof, said piston being of hollow cylindrical formation and having openings adjacent its upper end to admit air under pressure from the blow head, and having openings adjacent its lower end for the transmission of the air pressure into the mold during the compacting of the glass in the mold.

2. In a machine for forming hollow glass articles, the combination of a mold open at its upper end to receive a charge of glass, a blow head movable to and from the mold and adapted to seat on the said open end of the mold, a piston within the blow head adapted to be projected downward into the mold into position to rest on the glass in the mold, means for supplying air to the blow head for compacting the glass in the mold, said piston being movable upwardly by the pressure of the glass thereon when the glass is blown upward in the mold by air pressure supplied through the lower end thereof, said piston being of hollow cylindrical formation and having openings adjacent its upper end to admit air under pressure from the blow head, and having openings adjacent its lower end for the transmission of the air pressure into the mold during the compacting of the glass in the mold, and means for maintaining the air pressure in and through said piston during the expansion of the glass in the mold.

3. In a machine for forming hollow glass articles, the combination of a mold, an air motor above the mold comprising a vertically reciprocable piston and a downwardly extending piston rod, a blow head carried by the piston rod and movable downward thereby to seat on the mold, a second piston mounted in the blow head for up and down movement therein, and means for supplying air under pressure to the blow head when the latter is seated on the mold and thereby projecting said second piston downward into the mold, said second piston being movable upwardly by the pressure of a parison of glass in the mold when the glass is blown upward by air pressure supplied through the lower end of the mold, said second piston being of hollow cylindrical formation and provided with openings through the walls thereof to transmit air pressure from the blow head to the mold for compacting the charge of glass in the mold and to permit air pressure to be maintained in the mold above the glass, and also to maintain a regulated pressure of the piston on the upper surface of the glass while the parison is being blown upward in the mold.

Signed at Toledo, in the county of Lucas and State of Ohio, this 13th day of September, 1927.

JOHN F. RULE.